(12) United States Patent
Nicol

(10) Patent No.: US 8,876,137 B2
(45) Date of Patent: Nov. 4, 2014

(54) FRAME FOR A BICYCLE

(76) Inventor: Morgan Nicol, Collina d'Oro (CH)

( * ) Notice: Subject to any disclaimer, the term of this patent is extended or adjusted under 35 U.S.C. 154(b) by 0 days.

(21) Appl. No.: 13/379,258

(22) PCT Filed: Jun. 22, 2010

(86) PCT No.: PCT/EP2010/003756
§ 371 (c)(1),
(2), (4) Date: Mar. 19, 2012

(87) PCT Pub. No.: WO2010/149340
PCT Pub. Date: Dec. 29, 2010

(65) Prior Publication Data
US 2012/0274041 A1 Nov. 1, 2012

(30) Foreign Application Priority Data

Jun. 22, 2009 (DE) .......................... 10 2009 030 051

(51) Int. Cl.
*B62K 19/00* (2006.01)
*B62K 19/06* (2006.01)

(52) U.S. Cl.
CPC ..................................... *B62K 19/06* (2013.01)
USPC ........ 280/281.1; 280/274; 280/279; 280/276; 280/288.3

(58) Field of Classification Search
USPC ..................... 280/281.1, 274, 279, 276, 288.3
See application file for complete search history.

(56) References Cited

U.S. PATENT DOCUMENTS

| | | | | |
|---|---|---|---|---|
| 2,330,560 A | * | 9/1943 | Descos | 280/274 |
| 4,132,428 A | * | 1/1979 | Lassiere | 280/278 |
| 5,944,932 A | * | 8/1999 | Klein et al. | 156/245 |
| 7,147,237 B2 | * | 12/2006 | Cobb | 280/279 |
| 7,234,718 B1 | * | 6/2007 | Morrow et al. | 280/281.1 |
| 7,651,110 B2 | * | 1/2010 | Davis et al. | 280/281.1 |

FOREIGN PATENT DOCUMENTS

| | | |
|---|---|---|
| CA | 2 270 336 | 10/2000 |
| FR | 2 793 758 | 11/2000 |
| WO | WO 97/45315 | 12/1997 |
| WO | WO 2008/056204 | 5/2008 |

* cited by examiner

*Primary Examiner* — Joseph M Rocca
*Assistant Examiner* — Marlon Arce
(74) *Attorney, Agent, or Firm* — Greer, Burns & Crain, Ltd.

(57) ABSTRACT

A frame for a bicycle and a bicycle equipped therewith, wherein the frame includes a frame body having a top tube and a down tube, and at least one supporting device connecting the top tube to the down tube. A supporting device includes a flow-through opening through which, when used as intended, at least part of the arriving air flows.

14 Claims, 2 Drawing Sheets

FRAME FOR A BICYCLE

Figure 1:
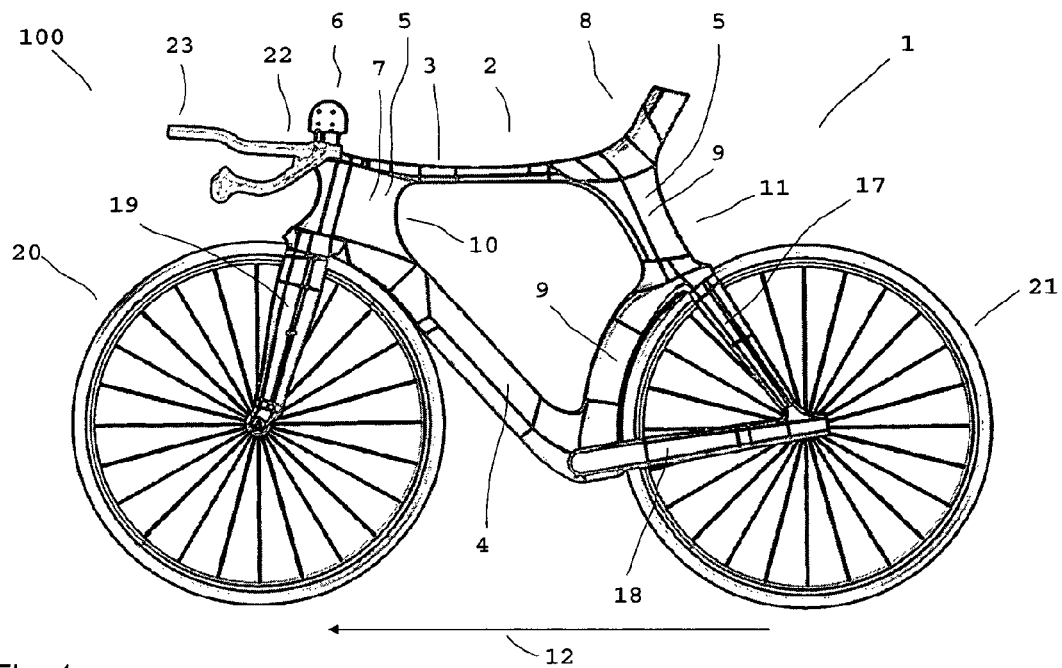

The present invention relates to a frame for a bicycle and a bicycle.

A great variety of frames for bicycles have become known in the prior art such as X frames, trapezoid frames, and in particular diamond frames, which offer an optimal combination of strength and weight.

The geometric design of a typical diamond frame is approximately a trapezoid and a triangle. The trapezoid forms the frame body or main frame consisting of a top tube and a down tube, and of a head tube and a seat tube connecting the top tube to the down tube. The rear region is provided with an approximately geometric triangle referred to as the rear triangle and comprising the seat stays, the chain stays, and the seat tube. Other than the frame designs indicated there exist further frame designs which differ in arrangement and structure.

What all the frames have in common is that viewed from in front they divert the air flow generated in riding to the sides where the diverted air flow hits the legs of the cyclist. In this way additional drag is created since the air stream will lead to considerable turbulence in the region of the cyclist's legs.

It is therefore the object of the present invention to provide a frame for a bicycle which allows reduced drag in riding.

This object is solved by a frame having the features of claim 1 and by a bicycle having the features of claim 18. Preferred embodiments are the subjects of the respective subclaims. Further advantages and characteristics of the invention can be taken from the embodiment.

The frame according to the invention is provided for a bicycle and comprises a frame body. The frame body comprises at least one top tube and at least one down tube, and at least one supporting device connecting the top tube to the down tube. According to the invention the at least one supporting device comprises a flow-through opening through which when used as intended at least part of the arriving air flows.

The frame according to the invention has numerous advantages. One considerable advantage of the frame according to the invention is that the supporting device connecting the top tube to the down tube comprises a flow-through opening such that when used as intended, any air arriving at the frame from the front will not be entirely diverted to the two sides of the frame but at least a considerable portion thereof will be guided through the flow-through opening of the frame. This will achieve a considerable advantage since the air guided through the flow-through opening does not generate increased drag at the rider's legs. Such drag is generated in conventional types of frames since the air arriving at the frame from the front is diverted to the sides and consequently arrives in particular on the legs of the rider.

In a simple configuration the frame according to the invention is provided for a bicycle, being substantially formed of a frame body which may be referred to as the main body. The frame body comprises at least one top tube and at least one down tube, and at least one seat tube connecting the top tube to the down tube and at least one head tube connecting the top tube to the down tube. At least one flow-through opening is provided in the head tube and/or in the seat tube through which when used as intended at least part of the air arriving from in front in riding will flow. The seat tube may serve to receive a seat post which may be for example height-adjustable. The fork may be rotatably received at the head tube.

Preferably the flow-through opening extends at least substantially in the longitudinal direction of the frame.

The frame body is in particular generally aerodynamic in shape to allow a generally low drag in addition to the optimal passing through of the air arriving.

A preferred embodiment provides for a head supporting device as the supporting device in a front region of the frame body. It is in particular preferred to provide a flow-through opening in the head supporting device so as to guide at least part of the air arriving at the frame from in front through the flow-through opening of the head supporting device.

Further preferred embodiments are provided with at least one seat supporting device as the supporting device in a rear region of this frame body, wherein it is then preferred for at least one flow-through opening to be provided at the seat supporting device.

In all of the configurations it is possible for more than one flow-through opening to be provided in one supporting device. For example two, three or four flow-through openings arranged side by side or in a symmetric pattern may be provided. It may be useful or necessary for example for reasons of stability to limit the overall size of the flow-through opening such that two or three or more separate, smaller flow-through openings achieve a generally optimal aerodynamic effect while offering sufficient stability.

Preferably at least part of the flow-through opening at the head supporting device and at the seat supporting device are aligned with one another. Such configuration offers the considerable advantage that the air guided through the flow-through openings of the head supporting device is guided towards the flow-through opening of the seat supporting device. In this way a particularly optimal aerodynamic shape is achieved since the air arriving from in front is first guided through the flow-through opening of the head supporting device and then conveyed further through the flow-through opening of the seat supporting device such that the air flowing through causes a particularly low drag.

In preferred more specific embodiments the head supporting device is aerodynamic in design and comprises at least two lateral head tubes or head sections wherein at least one of these head tubes or head sections is arranged to one side each of the flow-through opening. For example the head supporting device may be generally configured as a head profile approximately round in cross-section wherein the flow-through opening extends in the longitudinal direction of the frame in the region of the flow-through opening such that head tubes or head sections are laterally elevated to the sides of the flow-through opening which connect the lower portion of the head supporting device to the upper portion of the head supporting device.

Preferably one cross-section of the flow-through opening in the head supporting device is configured approximately oval or rounded. The height of the flow-through opening may be 10 or 20 centimeters or the like, while the width of the flow-through opening follows from the width of the frame and typically is a few centimeters. For example cross-sectional widths of 2 to approximately 10 centimeters are possible and preferred.

The lateral head tubes are preferably rounded in cross-section wherein they extend longer in the longitudinal direction of the frame than in the transverse direction.

Preferably the flow-through opening is generally configured nozzle-like such that an arriving air stream is guided through in a calculated way.

In all of the embodiments it is preferred for the flow-through opening in the head supporting device that the head supporting device is provided with an upper and a lower bearing or a lower and an upper point of support. Preferably the steerer section of the fork then also comprises at least one flow-through opening, wherein the flow-through opening of the steerer section is aligned with the flow-through opening of the head supporting device so as to ensure that the air arriving at the flow-through opening of the steerer section is conveyed.

The flow-through opening of the steerer section is laterally confined by steerer tubes or the like.

Preferably the flow-through opening of the seat supporting device is aligned with the flow-through opening of the head supporting device such that when used as intended at least part of the air first guided through the head supporting device is then guided through the flow-through opening of the seat supporting device.

The flow-through openings of the head supporting device, the steerer section, and the seat supporting device are in particular configured such that the air arriving at the flow-through opening of the steerer section in the front is guided through the flow-through opening of the seat supporting device in a calculated way.

In simple configurations the seat supporting device may be configured as a seat tube and the head supporting device as a head tube in which corresponding flow-through openings are provided.

In other preferred configurations, air guiding openings are provided in the fork tubes connected to the front dropouts to guide air, which arrives from in front at the fork tubes provided with the dropouts, to the sides past the legs of the rider.

The handlebar may be provided with air guiding devices which allow an aerodynamically optimal design.

The bicycle according to the invention comprises a frame comprising at least one top tube and at least one down tube, and at least one supporting device connecting the top tube to the down tube. At least one supporting device comprises a flow-through opening through which when used as intended at least part of the arriving air flows.

The frame is preferably configured as described above. Also, in particular the fork and/or the handlebar may be provided with at least one flow-through opening.

Other advantageous features and configurations of the invention can be taken from the following embodiment which will now be described with reference to the attached figures.

Figure 2:
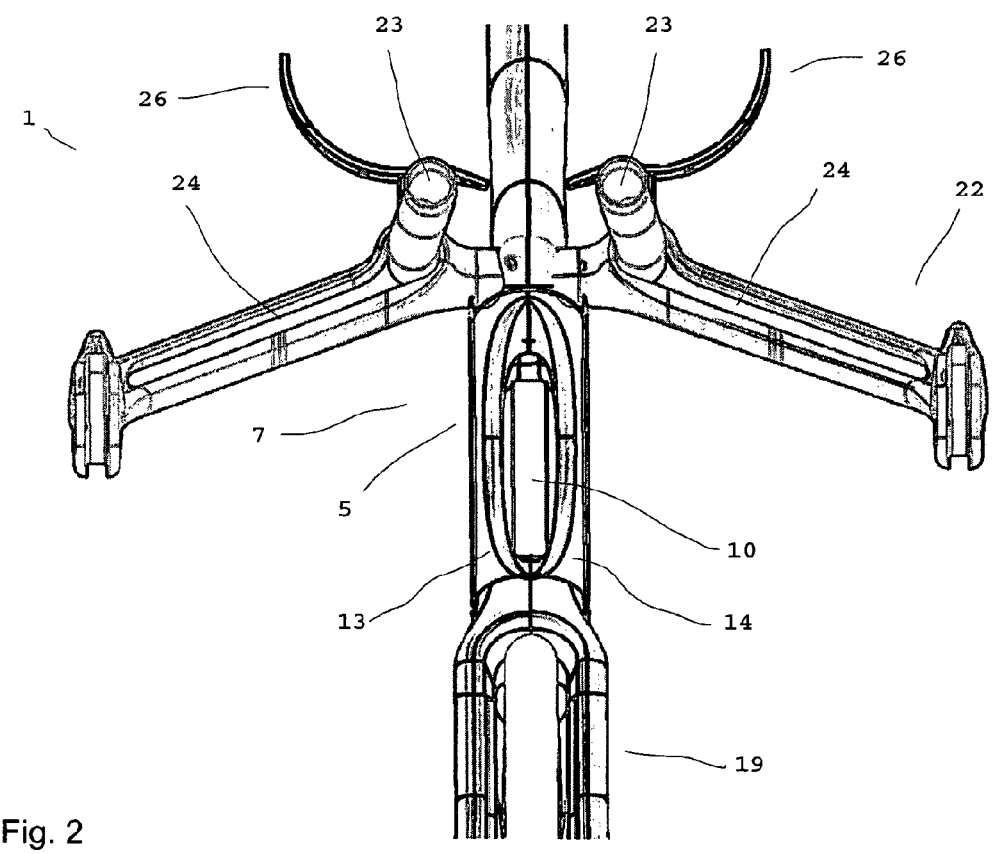
Figure 3:
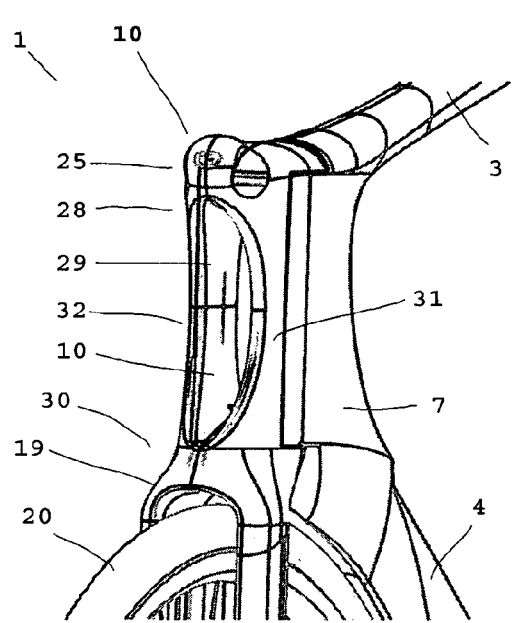
Figure 4:
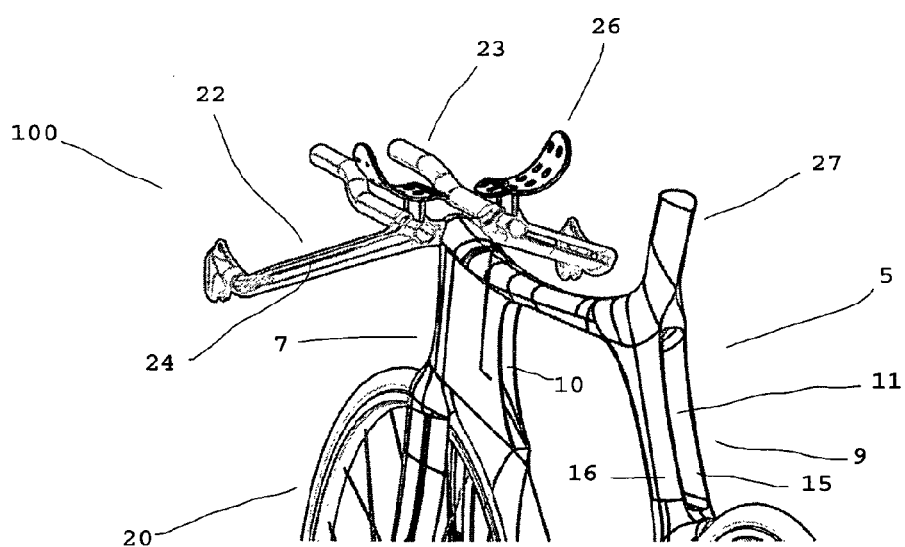

These show in:

FIG. 1 a side view of a bicycle equipped with a frame according to the invention;

FIG. 2 a perspective front view of the bicycle according to FIG. 1;

FIG. 3 a perspective view of the front frame region;

FIG. 4 a perspective partial rear view of the bicycle according to FIG. 1; and

Figure 5:
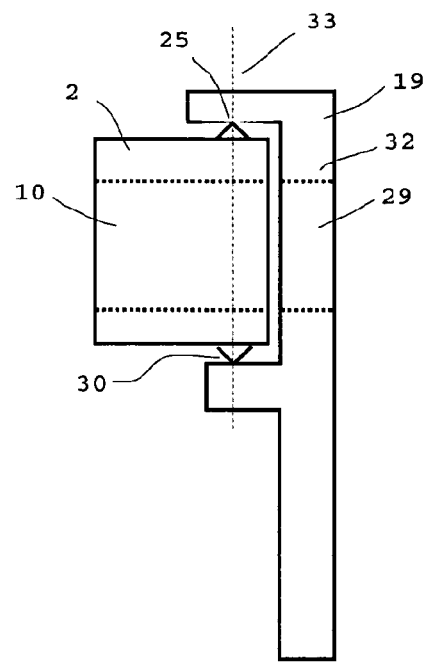

FIG. 5 a simplistic, schematic side view of the connection of the fork to the frame.

With reference to the FIGS. 1-5 an embodiment of a bicycle 100 according to the invention comprising a frame 1 will now be explained.

As shown in FIG. 1 in a side view of the bicycle 100, the bicycle 100 comprises a front wheel 20 and a rear wheel 21 and a frame 1 comprising a frame body 2. This frame body 2 is formed by a top tube 3, a down tube 4 and two supporting devices 5, wherein the front supporting device 5 is configured as a head supporting device 7 and the rear supporting device 5, as a seat supporting device 9. In simple configurations the head supporting device 7 is configured as a head tube and the rear seat supporting device 9, as a seat tube.

Neither the head supporting device 7 nor the seat supporting device 9 need to be rotationally symmetrical in cross-section but they are in particular generally aerodynamical in shape. Neither the head supporting device 7 nor the seat supporting device 9 need to be aligned in line but they may as well be curved or angular in design as can clearly be seen for example in the seat supporting device 9 in FIG. 1.

At its top end the seat supporting device 9 makes a transition into a seat post 27, presently in the rear region 8.

In the rear region 8 of the frame 1 the chain stays 18 and the seat stays 17 form an approximately triangular structure with part of the seat supporting device 9 receiving the rear wheel 21 at dropouts at the connecting point of the seat stays 17 to the chain stays 18.

In the front region 6 of the frame 1, the top end of the head supporting device 7 is provided with the handlebar 22 which is aerodynamic in shape as well and may comprise air guiding devices 24 in the lateral regions. The handlebar 22 may be provided with aero supports 23 and supports 26 for the user to assume an aerodynamically optimal riding position when grasping the aero supports 23 and placing his forearms on the supports 26.

The front wheel 20 is supported by the fork 19 which is rotationally received at the head supporting device 7.

FIG. 2 illustrates a partial front view of the bicycle 100 wherein the handlebar 22 with the air guiding devices 24 and the supports 26, as well as the aero supports 23 can be seen in the upper region, while the fork 19 extends in the lower region. It can clearly be seen that the supporting device 5 configured as a head supporting device 7 comprises a flow-through opening 10 through which air arriving at the frame 1 from the front is guided. This is different from the prior art where the air arriving at the frame in front is guided to the sides around the frame.

Presently, in front of the head supporting device 7 the steerer section 28 is arranged comprising a flow-through opening 29 which is aligned with the flow-through opening 10 of the head supporting device 7 so as to aerodynamically guide the air arriving from in front through the steerer section 28 and the head supporting device 7.

In the region of the flow-through opening 10, which presently extends in the longitudinal direction 12, the head supporting device 7 comprises lateral head tubes 13 and 14 or head sections to ensure the required strength of the head supporting device 7. Likewise the steerer section 28 is provided with a flow-through opening 29 wherein the steerer section 28 is carried by a steerer tube 31 on the left and a steerer tube 32 on the right in the region of the flow-through opening 29.

In a front view both the flow-through opening 10 of the head supporting device 7 and the flow-through opening 29 of the steerer section 28 are elongated and rounded or approximately oval in design to enable an aerodynamically optimal air guiding.

FIG. 3 shows a schematic perspective illustration of the fork 19 at the head supporting device 7, where the flow-through opening 10 of the head supporting device 7 and the flow-through opening 29 of the fork 19 can be seen. The steerer section 28 is rotationally supported at the head supporting section 7. This means that the alignment of the flow-through opening 29 of the fork 19 changes in turns. This is an advantage since in this way the air arriving from in front is guided through the flow-through opening 29 further toward and through the flow-through opening 10, such that air arriving in this region from in front is not diverted towards the legs of the rider which would increase drag.

An upper bearing 25 and a lower bearing 30 are provided to rotatably support the bicycle fork 19.

A simplistic schematic diagrammatic drawing of the fork suspension is shown in FIG. 5. It is shown that for example the fork 19 surrounds the head supporting device 7 fork-like or y-like such that the fork 19 is received at the bearings 25 and 30 to be rotatable around the rotational axis 33. Concurrently the flow-through openings 29 and 10 are aligned with one another such that arriving air is aerodynamically guided through the two openings.

The rear supporting device 5 which is configured as a seat supporting device 9 also comprises a flow-through opening 11.

This is clearly shown in FIG. 4 which illustrates a rear perspective part view of the bicycle 1. The rear flow-through opening 11 may extend across the substantial region or the substantial extension between the rear wheel 21 and the upper end of the seat supporting device 9. The air guided through from in front before the flow-through opening 11 is further conveyed through the flow-through opening 11 so as to generate a central air stream which is conveyed off while largely avoiding turbulences, generating only minor drag which is considerably lower than in the prior art.

The seat supporting device 9 has side walls or seat tubes 15 and 16 in the region of the flow-through opening to laterally confine the flow-through opening 11.

The invention generally provides a bicycle 100 comprising aerodynamic flow-through openings at the frame 1. More specific embodiments may provide for flow-through openings at the upper steerer section of the fork and at the fork blades, and the handlebar may comprise air guiding openings as well. Generally, an aerodynamic bicycle is provided.

LIST OF REFERENCE NUMBERS 1 frame
2 frame body
3 top tube
4 down tube
5 supporting device
6 front region
7 head supporting device
8 rear region
9 seat supporting device
10 flow-through opening
11 flow-through opening
12 longitudinal direction
13 head tube
14 head tube
15 seat tube
16 seat tube
17 seat stay
18 chainstay
19 fork
20 front wheel
21 rear wheel
22 handlebar
23 aero supports
24 air guiding device
25 bearing
26 support
27 seat post
28 steerer section
29 flow-through opening
30 bearing
31 left steerer tube
32 right steerer tube
33 rotational axis
100 bicycle

What is claimed is:

1. A frame for a bicycle comprising:
a frame body including a front region, at least one top tube, at least one down tube, and at least one supporting device connecting the top tube to the down tube, wherein said at least one supporting device includes a head supporting device on the front region of the frame body, said head supporting device being aerodynamic in shape and including at least two opposing head tubes, said head tubes defining a flow-through opening through which at least a portion of arriving air flows.

2. The frame according to claim 1, wherein the flow-through opening extends in a longitudinal direction.

3. The frame according to claim 1, wherein the frame body is aerodynamic in shape.

4. The frame according to claim 1, wherein a seat supporting device is provided in a rear region of the frame body as a supporting device.

5. The frame according to claim 4, wherein at least one flow-through opening is provided at the seat supporting device.

6. The frame according to claim 5, wherein the flow-through openings at the head supporting device and at least one opening at the seat supporting device are aligned with one another.

7. The frame according to claim 1, wherein each head tube is rounded in cross-section.

8. The frame according to claim 1, wherein at least one flow-through opening is configured nozzle-like so as to guide an arriving air stream through.

9. The frame according to claim 1, wherein the head supporting device comprises an upper bearing and a lower bearing.

10. The frame according to claim 1, wherein a fork device with an upper steerer section is provided.

11. The frame according to claim 10, wherein the steerer section comprises at least one flow-through opening.

12. The frame according to claim 11, wherein the flow-through opening is laterally confined by steerer tubes of the fork device.

13. The frame according to claim 11, wherein the flow-through opening of the steerer section is aligned with the flow-through opening of the head supporting device so as to guide when used as intended at least part of the arriving air through the flow-through openings of the steerer section and the head supporting device.

14. The frame according to claim 5, wherein the flow-through opening of the seat supporting device is aligned with the flow-through opening of the head supporting device so as to guide at least part of the air guided through the head supporting device, through the flow-through opening of the seat supporting device.

* * * * *